United States Patent [19]

Hodge

[11] Patent Number: 5,139,658
[45] Date of Patent: Aug. 18, 1992

[54] FILTER CANISTER MOUNTING

[75] Inventor: Rex Hodge, Evans City, Pa.

[73] Assignee: Fluidraulics, Inc., Evans City, Pa.

[21] Appl. No.: 574,804

[22] Filed: Aug. 30, 1990

[51] Int. Cl.$^5$ ............................................. B01D 35/027
[52] U.S. Cl. ............................ 210/167; 210/171; 210/172; 210/248; 210/440; 210/443; 210/475; 210/DIG. 17
[58] Field of Search ............... 210/166, 168, 282, 171, 210/172, 167, 196, 248, 249, 440, 443, 444, 473, 474, 475, 456, DIG. 17

[56] References Cited

U.S. PATENT DOCUMENTS

| | | | |
|---|---|---|---|
| 2,253,686 | 8/1941 | Burckhalter | 210/168 |
| 2,491,180 | 12/1949 | Horthy . | |
| 2,894,630 | 7/1959 | Humbert, Jr. | 210/DIG. 17 |
| 2,937,756 | 5/1960 | Humbert, Jr. . | |
| 2,995,249 | 8/1961 | Boewe et al. | 210/DIG. 17 |
| 3,076,551 | 2/1963 | Humbert, Jr. | 210/440 |
| 3,184,062 | 5/1965 | Humbert, Jr. | 210/DIG. 17 |
| 3,193,101 | 7/1965 | Humbert, Jr. | 210/DIG. 17 |
| 3,677,412 | 7/1972 | Conner | 210/DIG. 17 |
| 3,690,460 | 9/1972 | Lindboe | 210/440 |
| 3,743,096 | 7/1973 | Harvey, Jr. et al. . | |
| 3,929,643 | 12/1975 | Donaldson et al. | 210/DIG. 17 |
| 3,982,520 | 9/1976 | Wheeler . | |
| 4,051,036 | 9/1977 | Conrad et al. . | |
| 4,415,448 | 11/1983 | Lennartz et al. | 210/333.1 |
| 4,446,017 | 5/1984 | Oberg | 210/456 |
| 4,863,599 | 9/1989 | Guenther et al. | 210/248 |
| 4,906,365 | 3/1990 | Baumann et al. | 210/248 |

Primary Examiner—Stanley S. Silverman
Assistant Examiner—Robert James Popovics
Attorney, Agent, or Firm—Carothers & Carothers

[57] ABSTRACT

A fluid filter mount is affixed to the top closure wall of a fluid reservoir, such as for a hydraulic power unit, wherein the housing for the filter mounting is positioned below the top closure of the reservoir with the fluid inlet and fluid outlets also being provided in the housing below the top closure of the reservoir. The filter mount housing has an upwardly extending portion which extends into an opening in the top closure of the reservoir for exposure thereabove and is adapted to receive a canister type fluid filter thereon in sealed engagement with the filter in an upright position such that the fluid inlet and outlet are registered in communication with the filter for flow-through filtering. An upwardly open annular channel is provided on this filter mount such that it is positioned radially outward from the area wherein the filter canister is in sealed engagement with the filter mount and this annular channel is provided with at least one vertical through opening for gravitational flow of hydraulic fluid which will flow into the channel from a filter canister as it is being removed for exchange, and the fluid is permitted to thereby free flow back into the hydraulic fluid reservoir preventing any messy oil spills onto the hydraulic power unit and additionally providing a flush mount attractive mounting of the filter canister on top of the reservoir.

5 Claims, 2 Drawing Sheets

FILTER CANISTER MOUNTING

BACKGROUND OF THE INVENTION

The present invention relates to a canister type filter mounting and more particularly to such a filter when used in combination with a fluid reservoir.

Hydraulic equipment is driven with hydraulic fluid under pressure supplied by a hydraulic power unit. These hydraulic power units primarily consist of a reservoir for the hydraulic oil or fluid and a pump to pump the hydraulic fluid out from the reservoir under pressure. The oil has to be continuously filtered to remove unwanted residue and impurities. A spin-off canister type replaceable filter is generally employed in direct conjunction with the oil reservoir for periodic changing of the filter.

Typically, these hydraulic power units have inlet and outlet piping for the canister filters which is mounted above the top closure of the hydraulic fluid reservoir. The filter is mounted in an inverted position to a filter mount that is supported from these fluid inlet and outlet pipes which extend vertically from and through the top closure of the hydraulic fluid reservoir.

The problem with this type of prior art structure is that the inlet and outlet hydraulic fluid pipes and the mount and the filter canister itself are awkwardly exposed above the reservoir whereby they are exposed and subject to damage. In addition, the appearance of this type of prior art filter assembly tends to be unsightly and when changing filter canisters, invariably messy oil spills or hydraulic fluid spills will occur spilling oil over the top of the hydraulic fluid reservoir and other equipment on the hydraulic power unit. This is so even though the filter canister mount is positioned such that the canister is mounted in an inverted or upside-down position, as small amounts of oil remain in the feed lines of the filter mounting which is positioned above the inverted filter canister.

In an attempt to avoid these problems, one additional prior art filter canister mounting arrangement provides a filter mounting housing on top of the hydraulic fluid reservoir cover and the filter canister is secured downwardly on this filter mount such that the canister is held in an upright position. In order to assist in preventing leakage of oil from the filter canister when removing it, a check valve is provided in the canister to retain the oil in the canister in order to inhibit the spillage of oil over the top of the reservoir tank.

However, this latter mentioned prior art system is also not completely effective as residue oil will coat interior parts of the canister which bypass the check valve. Accordingly, oil spillage will still occur on the upper surface of the reservoir tank and also the filter canister mounting is exposed on top of the reservoir tank which further tends to make the overall appearance of the hydraulic power units less aesthetically appealing.

SUMMARY OF THE INVENTION

Therefore, it is an object of the present invention to provide a filter canister mounting for hydraulic power units which permits the filter canister to be mounted on top of the hydraulic fluid reservoir in an upright position, provides the major portion of the filter canister mounting below the top wall of the reservoir for an aesthetically appealing appearance, and provides a means for preventing any spills on the upper surface of the hydraulic fluid reservoir tank by draining any such spillage or excess flow of fluid directly to the reservoir interior.

The filter assembly of the present invention is provided in combination with a fluid reservoir, which fluid reservoir includes a top closure wall. The filter mounting is affixed to this top closure wall and has a housing portion which is positioned below the top closure wall and is further provided with a fluid inlet and a fluid outlet in order to feed fluid for filtering through a filter canister. This housing is further provided with a filter mount which extends upwardly from the housing into an opening in this top closure wall of the reservoir for exposure thereabove. This exposed portion of the filter mount is adapted to receive a canister type fluid filter thereon, such as a spinoff canister filter, in sealed engagement such that the filter canister is held in an upright position with the fluid inlet and the fluid outlet of the filter housing registered in communication with the filter for flow-through filtering. In this manner, the upright filter canister, when secured to the filter mounting, appears to be flush with the upper surface of the reservoir making an aesthetically pleasing appearance.

The upward exposed portion of this filter mount is also provided with an upwardly open annular channel which is positioned radially outward from the area where the canister is in sealed engagement with the mount, and this angular channel is further provided with at least one vertical through opening for gravitational flow of any liquid from the channel to the interior of the reservoir. In this manner, when the canister is removed for replacement, all residual hydraulic fluid or liquid is captured in this angular channel and is thereby automatically drained by gravity through the vertical through opening or openings and permitted to return to reservoir, thereby absolutely preventing any messy spillage of oil over the top of the reservoir tank or any other components of the hydraulic power unit.

The sealed engagement between a filter canister and the filter mount is normally provided by an annular seal that is initially secured to the canister and the aforedescribed annular channel provided for draining excess fluid flow is positioned radially outward from this annular seal when the canister is in position on the mount. Normally this annular channel would be coaxial with this annular seal.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principals of this invention wherein:

DESCRIPTION OF A PREFERRED EMBODIMENT

Figure 1:
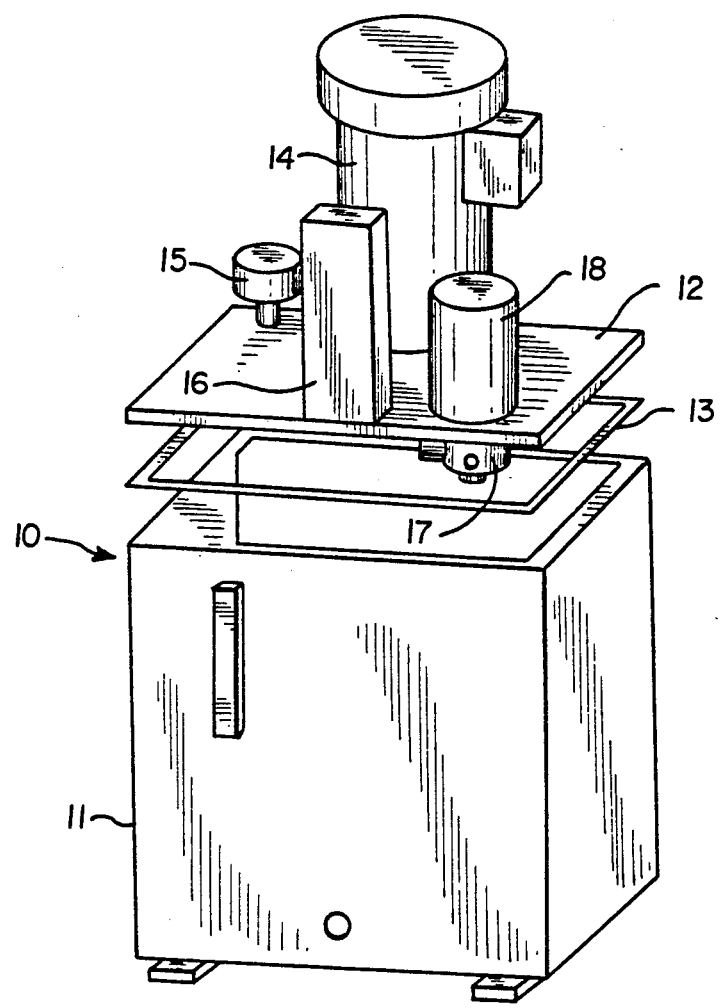
FIG. 1 is a verticle isometric exploded view illustrating the filter canister mounting of the present invention in combination with a vertical hydraulic power unit.

Referring to FIG. 1, a hydraulic power unit 10 is shown and includes hydraulic fluid reservoir 11 having a top closure wall 12 in the form of a plate which is mounted in sealed engagement with the upper edge of the tank of reservoir 11 with a seal or gasket 13 therebetween.

In typical fashion, this hydraulic power unit is provided with an electric motor 14 for driving a hydraulic fluid pump (not shown) mounted underneath top closure wall 12 in order to supply fluid under pressure. Also conventionally provided is an air breather assembly 15 for the reservoir and a hydraulic fluid manifold assembly 16.

The present invention is directed to fluid filter mounting 17 for filter canister 18.

Figure 2:
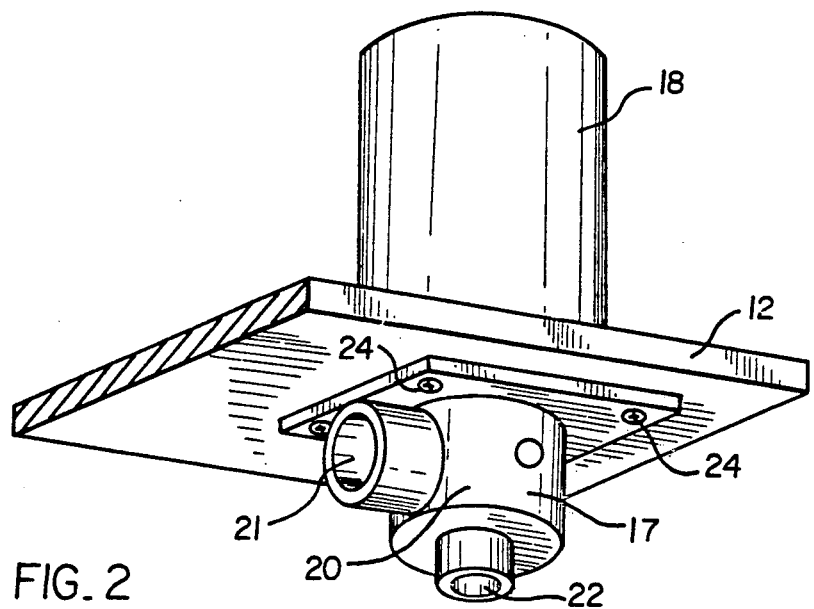
FIG. 2 is an enlarged isometric view of the filter canister mounting portion of the hydraulic power unit illustrated in FIG. 1.
Figure 4:
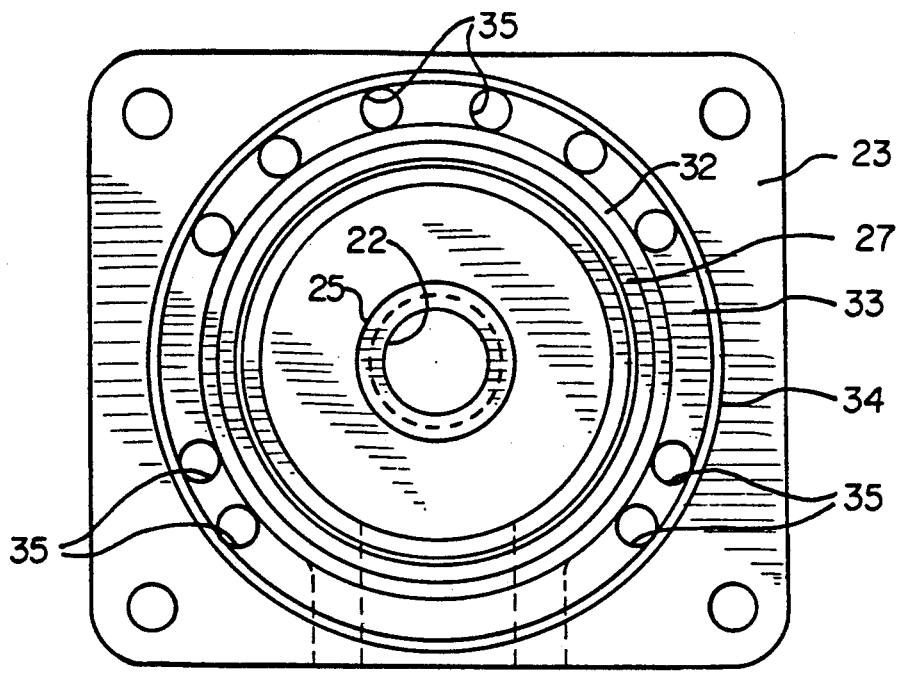
FIG. 4 is a plan view of the canister filter mount shown in FIG. 3 with the filter canister and reservoir top closure removed.
Figure 3:
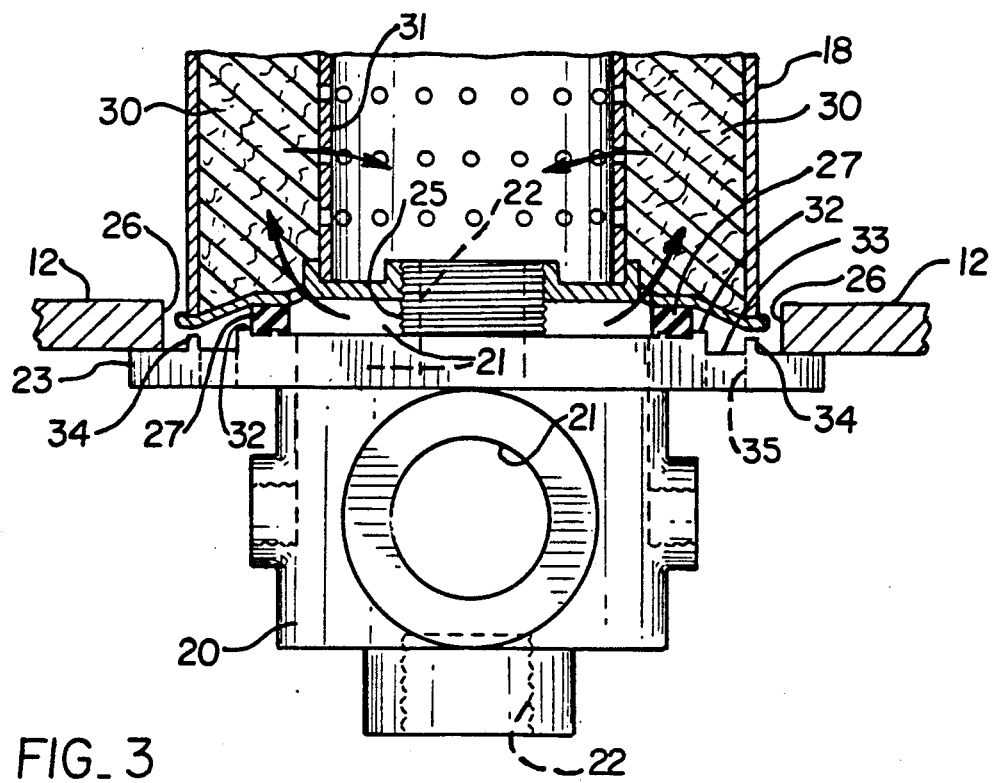
FIG. 3 is a detailed view in side elevation of the filter mount shown in FIG. 2 with the filter canister mounted thereon and shown in partial vertical section.

Referring also to FIG. 2, fluid filter mounting 17 is affixed to top closure wall 12 and has a housing 20 positioned below top closure wall 12 with a fluid inlet 21 and a fluid outlet 22. The upper portion of housing 20 is provided with flange 23 which is affixed or secured to the underside of top closure 12 by means of bolts 24. Housing 20 is provided with a filter mount 25 which extends upwardly into opening 26 in top closure wall 12 to receive the filter canister 18 thereon in sealed engagement as is illustrated in FIGS. 3 and 4.

Filter canister 18 is of the spin-off type and when it is fully screwed down onto mount 25, annular seal 27, which is initially secured to the filter canister, will provide liquid sealing engagement between filter canister 18 and filter mount 20 so that filter canister 18 is held in an upright position as shown with fluid inlet 21 and fluid outlet 22 respectively registered in communication internally with filter canister 18 for flow-through filtering as indicated by the arrows. Flow-through canister filter 18 is of conventional design and the hydraulic fluid being filtered flows upwardly under pressure through the filter material 30 and then to the central area of the filter through the perforations in the inner cylindrical perforated wall 31, thence to outlet 22 for discharge.

Annular seal 27 is normally provided with each new filter canister 18 and is stuck thereto. However, as each new canister is screwed down to the threaded stud of mount 25, seal 27 is compressed tightly also against the upper surface of flange 23 of mount 25.

Normally when filter canister 18 has to be replaced because it has become clogged due to filtering action, the canister will be unscrewed from the threaded stud on mount 25 and canister 18 together with its attached seal 27 will pull away from mount 25 and hydraulic fluid will drain back from filter canister 18 and what does not go downward into outlet 22 and downward also into inlet 21, which is then of course not pressurized with fluid, will then flow or spill over annular lip 32 into the upwardly open annular channel 33 formed between the inner annular lip 32 and the outer annular upwardly protruding lip 34.

Thus, all excess hydraulic fluid which would normally flow out of filter canister 18, as it is being removed, onto the upper surface of top closure 12, will instead flow over annular lip 32 into annular channel 33 and then drain quickly by gravity down through vertical through openings 35 in angular groove 33 thereby returning all of the fluid within the annular groove directly to the reservoir. This maintains the upper surface of the reservoir 11 free of any spillage and further provides a mounting means for filter canister 18 wherein the canister when completely screwed down is in an upright position with its lower lip below or flush with the upper surface of closure 12 to thereby providing a very smooth and uncluttered appearance to the hydraulic power unit without exposing any elements of the canister mounting itself to injury.

I claim:

1. A combination fluid reservoir and filter assembly comprising: a fluid reservoir including a top closure wall; fluid filter mounting means affixed to said top closure wall and having a housing positioned below said top closure wall with a fluid inlet and a fluid outlet; said housing having a filter mount extending upwardly from said housing into an opening in said top closure wall for exposure thereabove and constructed and arranged to receive a canister type fluid filter thereon in sealed engagement in an upright position with said fluid inlet and outlet connected for communication with a filter for flow-through filtering; and an upwardly open annular channel means on said mount positioned radially outward from the area of said sealed engagement and having at least one vertical through opening for gravitational fluid flow from said channel to said reservoir.

2. The combination of claim 1 including an annular seal on said mount exposed above said top closure wall to provide at least a portion of said sealed engagement, said channel means positioned radially outward from said annular seal.

3. The combination of claim 2 wherein said annular channel means is coaxial with said annular seal.

4. The combination of claim 1 including a canister type fluid filter received on said mount in sealed engagement for fluid filtering.

5. The combination of claim 4 wherein said fluid is hydraulic oil.

* * * * *